May 12, 1931.  H. WOCHNER  1,804,448

TRACKING GAUGE FOR AUTOMOBILES

Filed July 5, 1929

INVENTOR.
Henry Wochner,
BY Walter N. Haskell,
his ATTORNEY

Patented May 12, 1931

1,804,448

UNITED STATES PATENT OFFICE

HENRY WOCHNER, OF ROCK ISLAND, ILLINOIS, ASSIGNOR TO BEAR MANUFACTURING COMPANY, OF ROCK ISLAND, ILLINOIS

TRACKING GAUGE FOR AUTOMOBILES

Application filed July 5, 1929. Serial No. 376,051.

My invention pertains to a tracking gauge for automobiles, and has for its chief purpose to aid in detecting faults in the alignment of the front wheels of the vehicle with the rear wheels, such as may be caused by the frame of the car being swung or swayed toward one side or the other, or an axle being out of proper position. By the use of the invention it will be possible to determine such inaccuracies and the extent thereof, and enable a mechanic to make the necessary corrections to bring the faulty parts back to normal.

Another feature of the invention consists in the possibility of using the same as a wheel aligner, to determine if the front wheels of the vehicle have the desired amount of inclination, or "toe-in", and if the same is faulty, make the necessary corrections.

The invention is also capable of various adjustments, which can be quickly made, and by means of which the tool can be quickly adjusted to automobiles of different builds, and also adjusted to show the amount of inaccuracy in the automobile frame and associated parts.

The above named, and other features and advantages of the invention will be more particularly pointed out in the following specification, reference being had to the accompanying drawings, in which.

Figure 1:
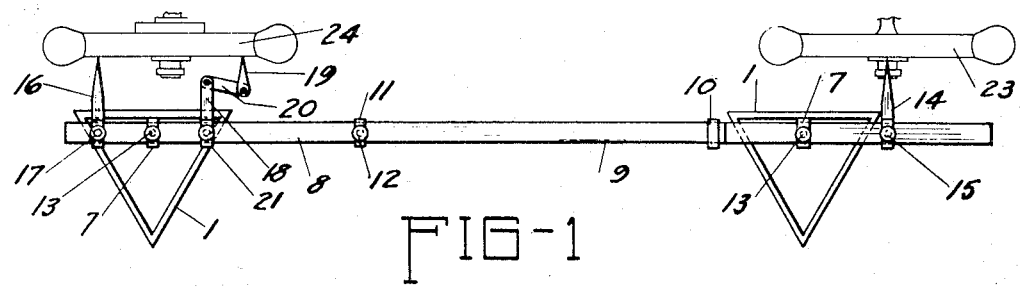
Fig. 1 is a plan view of the invention in position for use.
Figure 2:
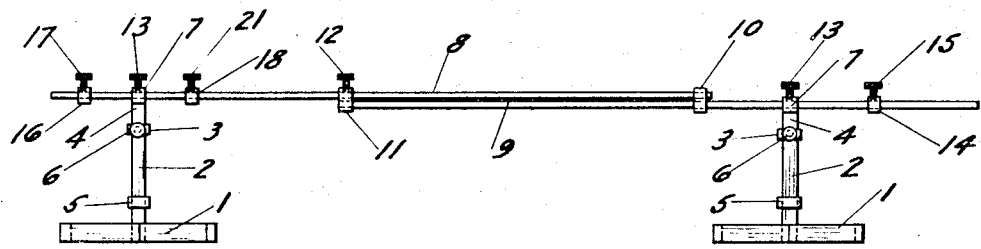
Fig. 2 is an outer side elevation thereof.

The invention includes a pair of stands, each comprising a triangular base 1, from one of the sides of each of which projects upwardly a standard 2, provided at its upper end with a guide 3, in which is slidable a bar 4. At the lower end of said bar is a guide 5 slidable on the standard 2. By this means the bar 4 can be raised or lowered, and held in adjusted position by means of a thumb-screw 6 in the guide 5, bearing against the bar 4.

On the upper end of each bar 4 is a sleeve 7 in which is supported a gauge-bar, formed of overlapping sections 8 and 9, the part 8 being fitted at its inner end with a guide 10, in which the bar 9 slides, and the bar 9 being similarly provided with a guide 11, in which the bar 8 is slidable. The length of the gauge-bar can thus be lengthened or shortened, as desired, and the sections held in adjusted positions by a thumb-screw 12 in the guide 11, bearing against the bar 8. Said bar sections are also capable of adjustment longitudinally in the sleeves 7, and can be held from movement therein by thumb-screws 13 in said sleeves.

On the outer end of the bar section 9 is slidably mounted an indicator 14, pointed at its outer end and attachable to the bar by means of a thumb-screw 15 in the sleeve part of the indicator. The outer end of the bar 8 is similarly provided with an indicator 16, provided with a thumb-screw 17 for fixing the same in place. On the same end of the bar 8 is supported an indicator 18, provided with a pointer 19 capable of a free swinging movement by means of a link 20 one end of which is pivoted to the part 18 and the other end to the pointer 19. By this means the position of the pointer can be changed for measuring different spacings between the bar 8 and parts of an automobile, as hereinafter pointed out. By means of a thumb-screw 21 the indicator 18 can be held in place on the bar 8. The link 20 has a frictional bearing with the parts 18 and 19, so that the pointer will remain in any position in which it is set until moved again.

Figure 3:
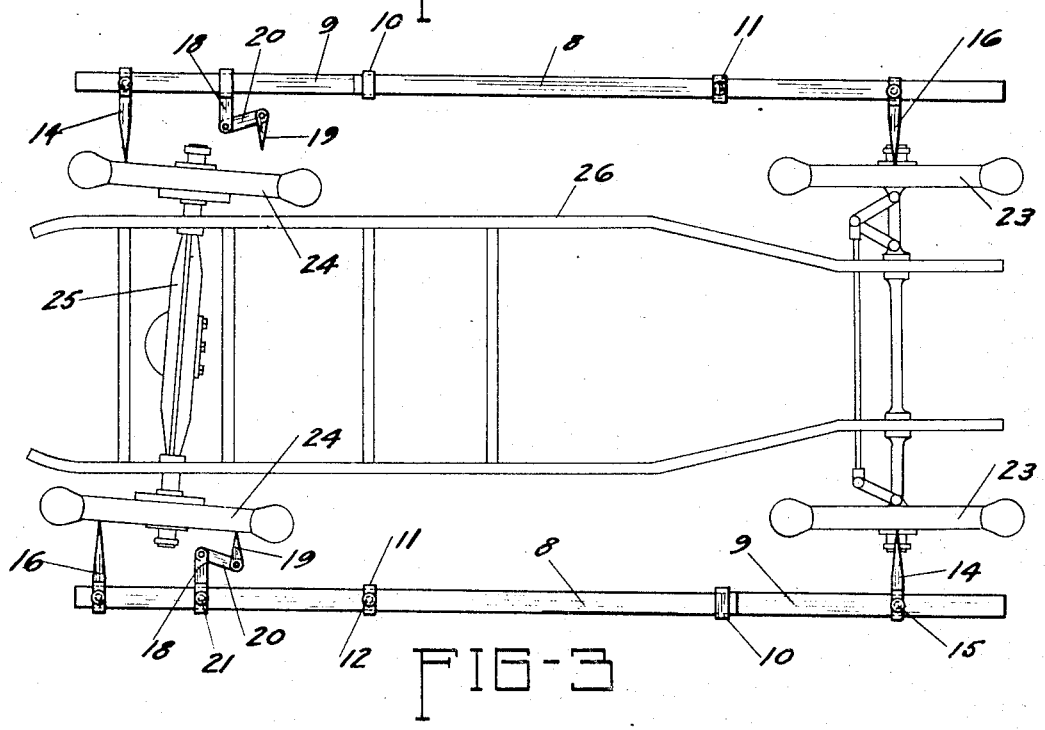
Fig. 3 is a diagrammatical view showing the manner of using the invention.
Figure 4:
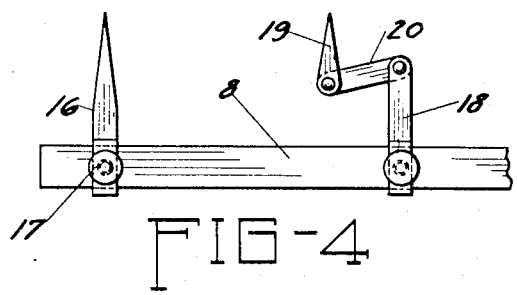
Fig. 4 is a detail of the measuring devices.

The pointers 14 and 16 are of the same length, and if they are set against the felloes of the front and rear wheels of a vehicle, as indicated at 23 and 24 in Fig. 1, if the wheels are in alignment the gauge-bar 8—9 will be substantially parallel with the center line of the frame to which the wheels are attached, and if the pointer 19 is also set against the felloe 24 of the rear wheel at a point spaced from the pointer 16 such pointer 19 will give a measurement between the bar and felloe similar to that of the other indicators. If the rear axle is out of place, however, as indicated at 25 on the frame 26, (Fig. 3) the pointer 19 will give a different spacing from that of the fixed indicators. After being set as shown at the lower side of the figure the instrument is changed to the other side of the car, with the indicator 16 in position against the wheel 23 and the indicator 14 at the rear, with the indicator 18 in proximity thereto. A space is then shown between the end of the pointer 19 and felloe 24, a measurement of which may be taken to determine the degree of the fault in the axle. The necessary change in position will equal one-half of this space. In the same way if there is a swing or sway of the chassis to one side or the other, a bend in the front or rear end, or a diamond-shaped frame, a proper reading with the gauge will disclose the fault, and indicate the correction needed.

The device can also be used as a wheel aligner, to determine whether or not the front wheels are properly positioned with relation to the line of travel of the car. Assuming that the wheel 23 in Fig. 1 is the rear wheel, and the wheel 24 the front wheel of the vehicle, with the instrument in position as shown, if the points of all three indicators are in line it shows that the wheels are in alignment, and that the front wheel does not have the inclination, or "toe-in" which is usually desired for the front wheels, and the desired corrections can be made.

It will be obvious that for automobiles of varying wheel bases adjustments can be made by extending or contracting the length of the gauge-bar, that said bar can be supported at a convenient height by adjustment of the stands upon which it is mounted, so that readings may be made with the indicators with their points at the centers of the hub-caps, or above or below the same. The indicators can also be adjusted longitudinally of the bar, as before mentioned, so as to properly position the same on the wheels.

For some uses the invention can be employed without the movable indicator 18. For instance, the pointers 14 and 16 can be placed against the centers of the hub-caps of the wheels on one side of the vehicle, and then similarly positioned against the wheels at the other side, and if they register with the centers of the hub-caps on both sides it shows the axles are in parallel relation with each other.

Changes can be made in the form and arrangement of the parts of the invention without departing from the general scope thereof. For example, the several indicators which are mounted on the gauge-bar can have a frictional sliding engagement therewith, and the thumb-screws omitted.

What I claim, and desire to secure by Letters Patent, is;

1. In a device of the class described, an extensible gauge bar, a pair of supports therefor, including members capable of adjustment vertically, and indicating devices on said bar and capable of adjustment longitudinally of the bar and means whereby said devices are capable of being held in adjusted positions.

2. A device of the class described, comprising a gauge-bar and gauge devices thereon to establish the position of the bar, with relation to the wheels of an automobile, and capable of reversal on said bar for use at either side of said automobile and a secondary gauge device on said bar to indicate variations from true in the frame of a vehicle to which the gauge-bar is applied.

3. A device of the class described, comprising a gauge-bar of sufficient length to include the front and rear wheels of an automobile in one operation, gauge devices slidably adjustable thereon and adapted to establish the position of the bar with relation to the wheels in such operation, and an auxiliary gauge device comprising a member mounted on said bar so as to be slidably adjustable thereon, a link pivoted to the end of said member, and a pointer pivoted to the other end of said link.

In testimony whereof I affix my signature.

HENRY WOCHNER.